United States Patent [19]

Araki et al.

[11] Patent Number: 5,671,338

[45] Date of Patent: Sep. 23, 1997

[54] CONSTRAINT EVALUATION SYSTEM, EXPERT SYSTEM, AND CONSTRAINT EVALUATION METHOD

[75] Inventors: Dai Araki, Yokohama; Katsumi Narimatsu, Kawasaki, both of Japan

[73] Assignee: Kabushiki Kaisha Toshiba, Kanagawa-ken, Japan

[21] Appl. No.: 423,576

[22] Filed: Apr. 18, 1995

[30] Foreign Application Priority Data

Apr. 19, 1994 [JP] Japan .................................. 6-080697

[51] Int. Cl.⁶ .................................................. G06F 15/18
[52] U.S. Cl. ............................................................ 395/51
[58] Field of Search ............................. 395/51, 10, 650, 395/600, 120; 364/401, 402, 468

[56] References Cited

U.S. PATENT DOCUMENTS

| | | | |
|---|---|---|---|
| 4,852,001 | 7/1989 | Tsushima et al. | 364/401 |
| 5,053,970 | 10/1991 | Kurihara et al. | 364/468 |
| 5,197,116 | 3/1993 | Katoh et al. | 395/51 |
| 5,216,593 | 6/1993 | Dietrich et al. | 364/402 |
| 5,267,346 | 11/1993 | Maruyama et al. | 395/10 |
| 5,353,229 | 10/1994 | Tanaka | 364/468 |
| 5,355,474 | 10/1994 | Thuraisngham et al. | 395/600 |
| 5,392,430 | 2/1995 | Chen et al. | 395/650 |
| 5,485,549 | 1/1996 | Sakaguchi et al. | 395/51 |
| 5,497,452 | 3/1996 | Shimizu et al. | 395/120 |

FOREIGN PATENT DOCUMENTS

| | | |
|---|---|---|
| 4-342059 | 11/1992 | Japan . |
| 5-53813 | 3/1993 | Japan . |

OTHER PUBLICATIONS

Meng et al., LOGOS–TCS: An expert system language for operations management based on temporal constraint satisfaction, Sixth conference on AI applications, pp. 214–221 May 9, 1990.

Meng et al., Embedding constraint satisfaction in deductive reasoning, Tenth International Phoenix conference on computers and communications. pp. 785–791 Mar. 30, 1991.

Shankar, Z–Schedular: Integrating theories on scheduling behaviour into a computational model, IEEE 1991 International conference on systems, man and cybernatics., pp. 1367–1371 Oct. 16, 1991.

Arbon et al., Auto–MPS: An automated master production scheduling system for large volume manufacturing, Proceedings of the tenth Conference on artificial intelligence for applications, pp. 26–32 Mar. 4, 1994.

Meng et al., LOGOS: A constraint directed reasoning shell for oerations management, IEEE Expert, pp. 20–28 Feb. 1991.

Badie et al., Operations, Research and artificial Intelligence cooperation to solve scheduling problems: The OPAL and OSCAR systems, First Intl. conference on Expert system, pp. 1–5 Jun. 29, 1990.

(List continued on next page.)

*Primary Examiner*—Robert W. Downs
*Assistant Examiner*—Sanjiu Shah
*Attorney, Agent, or Firm*—Finnegan, Henderson, Farabow, Garrett & Dunner, L.L.P.

[57] ABSTRACT

Constraint evaluation system, expert system, and constraint evaluation method for evaluating an allocation proposal, in which the job combinations are selected for individual evaluation to test if each combination is consistent with a constraint. This shows whether there is a restriction in which one of the jobs of a combination is determined uniquely by the other job of the combination. When a restriction is detected, the current value, which has the restriction, is replaced with the restricted value of the job which is uniquely determined by a one-to-one dependency relation. After the individual evaluation associated with the restricted job is performed, a job other than the other job of the combination is selected.

14 Claims, 5 Drawing Sheets

OTHER PUBLICATIONS

Ramaritham, Allocation and scheduling of complex periodic tasks, Proceedings. The 10 International conference on Distributed Computing systems, pp. 108–115 Jun. 1, 1990.

Chaudhuri et al., ILP-based scheduling with time and resource constraints in high level synthesis, Proceedings of the seventh International conference on VLSI Design, pp. 17–20 Jan. 8, 1994.

Chaudhri et al., The structure of assignment, precedence and resource constraints in the ILP approach to the scheduling problem, Proceedings of 1993 IEEE International conference on computer design, pp. 25–29 Oct. 6, 1993.

|  | 9/1 | | | | 9/2 |
|---|---|---|---|---|---|
|  | 0 | 6 | 12 | 18 | 0 |
| Machine 1 | | A | B | | C |
| Machine 2 | | D | | | |

FIG.-4

```
1:   For all JOB1 and JOB2
2:   IF
3:           JOB1 == (JOB2 @ BEFORE-JOB)
4:           (JOB1 @ TOOL) ≠ (JOB2 @ TOOL)
5:   THEN
6:           (JOB2 @ START-TIME) - (JOB1 @ END-TIME) ≧ 1
```

CONSTRAINT EVALUATION SYSTEM, EXPERT SYSTEM, AND CONSTRAINT EVALUATION METHOD

BACKGROUND OF THE INVENTION

1. Field of the Invention

This invention relates to a constraint evaluation system, an expert system using the constraint evaluation system, and a constraint evaluation method, used for allocation problems such as scheduling.

2. Description of the Related Art

Allocation is one of the fields in which an expert system, a computer system that acts as a human expert to make judgments, is used. Allocation is a broad concept including both the allocation of physical elements to a space and the allocation of time and resource to a job. Examples of physical element allocation are a system layout design and LSI layout design. On the other hand, time and resource allocation is called a scheduling problem. Those types of allocation must be done such that each element satisfy the predefined constraints.

The scheduling problem is one of the major problems with constraint evaluation. It is defined as "a problem of allocating to a given job the resources and processing time required for process execution." Scheduling is applied to a variety of fields including production scheduling in manufacturing industries, daily planning, project scheduling, vehicle operation planning in the transportation industry, or air port or harbor facilities operation.

The scheduling problem has been studied hitherto in the field of operations research. Many algorithms have been proposed by formulating it as a problem in which the search is made to find a combination of schedules satisfying the given constraints. However, when executing on a computer, this type of solution, though effective for small-scale problems, cannot find solutions in many large-scale problems within a given period of time and with the use of existing computer resources, because there are a huge number of element combinations.

To avoid this problem, an expert system is applied to the scheduling problem. An expert system specifically designed for the scheduling problem is called a scheduling system. The scheduling system uses the heuristic method, which is used by an experienced planner to make a schedule, to simulate a knowledge base on the computer, increasing the efficiency of work, streamlining the planning task, and increasing the quality of planning.

The inference mechanism of this type of scheduling system has at least two functions: the first function assign jobs on a schedule and the second function evaluates scheduling constraints. Cooperation of these two functions re-creates the alternative schedule until it satisfies the constraints.

Schedule arrangement, the first function, is implemented by repeating the following two procedures—"select one of the jobs that is not yet allocated" and "arrange the job at a location in the schedule table." In some cases, such procedures as "move an already-arranged job to another location" and "remove an already-arranged job" can be added as the schedule arrangement procedure.

The second function is constraint evaluation, which evaluates whether or not the schedule satisfies the constraints. More specifically, the function judges whether or not the relation among jobs on the schedule (data) satisfies the constraint condition. The constraints are evaluated each time the schedule is rearranged. Therefore, the evaluation method affects the processing speed of the whole inference mechanism. The constraint evaluation is applied not only to scheduling but also to the arrangement of physical elements.

This type of scheduling system represents a constraint for n jobs—JOB1, JOB2, . . . , JOBn—in the rule format consisting of the IF portion (first part) and the THEN portion (second part) as follows:

IF—THEN—

For example, consider a daily schedule for a part assembly line. The constraint for this application is that "it takes one hour to exchange tools when the same machine is used to do two different jobs continuously each requiring different tools." This constraint is defined as a rule shown below in the scheduling system:

For two jobs—JOB1 and JOB2—on the schedule,

IF

JOB1 immediately precedes JOB2 and JOB1 uses the tools that are not used by JOB2

THEN

JOB2 starts one hour after JOB1 is terminated.

A constraint evaluation system in the conventional scheduling system selects all the ordered two different jobs from a set of n jobs—JOB1, JOB2, . . . JOBn—on the schedule, finds the combinations satisfying the condition described in the IF portion, and then determines whether or not each of those combinations of the jobs satisfies the condition described in the THEN portion. In this specifications, the constraint evaluation of a combination of the jobs is called individual evaluation.

Problems to be Solved by the Invention

In the conventional constraint evaluation system, if the total number of jobs on the schedule is m, it is necessary to perform individual evaluation for as many as n! (=m * (m−1) * . . . * (m−n−1) job combinations in order to test if the condition described in the IF portion is satisfied. Therefore, as total number of jobs increases, the number of combinations to be tested in individual evaluation increases explosively, the time needed to find the result of constraint condition evaluation is prolonged and, as a result, no solution would be found within a limited time.

In general, a constraint is described using numerical expressions and variables. In this case, a job included in the schedule is represented as a unique variable value. And, a set of variable values are assigned sequentially to the variables for evaluation.

For example, assume that the IF portion of a constraint contains the conditional clause "JOB1 is equivalent to the job immediately preceding JOB2" and that, at any given point, the job "job-A" in the schedule table is assigned to the variable JOB2. In this case, the value of the variable JOB1 is determined to be a job, for example job-B, that immediately precedes "job-A". Thus, when the value of JOB2 is "job-A", the value of JOB1 is restricted to "job-B". This means that, once a value is assigned to JOB2, the value of JOB1 is uniquely determined and restrained by the value assigned to JOB2.

This situation is described as follows: "The variable JOB1 has an one-to-one dependency to the variable JOB2", "the variable JOB1 is restricted by the variable JOB2", "the variable JOB2 is restricting the variable JOB1," and IF the value of JOB2 is "job-A", JOB1 is restricted to "job-B" is called as "restricted element" of JOB1.

In the above example, when the value of JOB2 is "job-2", the individual evaluation of the IF portion with a value other than "job-1" assigned to JOB1 always results in the false condition. Thus, the individual evaluation of any combination, in which a value other than the value restricted by the value of JOB2 is assigned to JOB1, is unnecessary.

It is possible to select, in advance, the combinations to be evaluated and to store them in array variables. However, this method requires an extremely large memory area when the constraint involves many elements. In addition, depending upon the constraint, restricted values cannot be calculated unless values are actually assigned to variables. In that case, this method cannot be used.

This invention has been proposed to solve the problems of the prior art described above. Accordingly, it is an object of this invention to provide a constraint evaluation system, an expert system, and a constraint evaluation method to perform high-speed evaluation by bypassing the evaluation of unnecessary combinations.

Another object of this invention is to provide a constraint evaluation system that is suitable for computer processing involving numerical expressions and variables.

It is a still further object of this invention to provide a constraint evaluation system whose operating procedure is simple.

SUMMARY OF THE INVENTION

To attain one embodiment of the present above objects, the invention is a constraint evaluation system which, based on allocation proposal data representing an allocation proposal containing plural elements and condition data representing a constraint for the allocation proposal, evaluates the validity of the allocation proposal with the constraints. Structure is provided for sequentially selecting a combination of elements for evaluation, for performing individual evaluation in which a test is made to see if each combination is consistent with the constraints, for detecting a restriction in which one of the elements of a combination is uniquely determined by the other element of the combination for replacing the current elements of combination which has restriction with the restricted elements, and for replacing one or plural element of current combination which do not have restriction with the other elements, where the third selecting is practiced after the individual evaluation of the assignments containing restricted elements.

When a restriction is detected, elements containing the restriction are replaced with the corresponding restricted elements, and then individual evaluation is performed. In addition, after the individual evaluation of the restricted element, the other element of the combination is changed to some other element and then individual evaluation is performed. Thus, when a restriction is detected, individual evaluation is performed for the combination of all of the pairs of restraining elements and the corresponding restricted element. And, there is no need to evaluate the combinations including restricting elements and non-restricted elements. This prevents individual evaluation from being performed for unnecessary combinations, thereby speeding condition evaluation and the creation of an allocation candidate through condition evaluation.

In another embodiment, the elements are represented by variables, and the selection is performed by assigning elements to variables.

In another embodiment, the condition data is represented by conditional statements, and structure detects the restriction when an evaluation of equal relationship between a variable value and a function value occurs in the condition statements, and this relationship lead to one-to-one dependency.

This eliminates the need for the procedure for pre-detecting the restriction in the conditional statement and pre-determining the pair of restricting value and restricted value, and therefore makes the components of constraint evaluation system simpler.

In yet another embodiment, the condition data consists of the first half representing objects to which a corresponding constraint is applied and the latter half representing the contents of the constraint, and structure detects the restriction in the evaluation of the first half.

This embodiment eliminates the need for processing the latter half of the constraint for unnecessary combinations and increases the speed of constraint evaluation.

In a further embodiment structure detects a restriction by detecting specified data in the condition data which causes the restriction.

This eliminates the need for assigning values to the variables in the conditional statements, making the procedure simpler to use.

In another embodiment, a constraint evaluation system is based on schedule data representing a schedule containing plural jobs and condition data representing a constraint for the schedule and evaluates the validity of the schedule with the constraint. The constraint evaluation system includes structure for sequentially selecting a combination of schedules for evaluation for performing individual evaluation in which a test is made to see if each combination is consistent with the constraint, for detecting a restriction in which one of the jobs in the combination is uniquely determined by the other job in the combination, for replacing jobs in the combination which has restriction with the restricted jobs, and for replacing one or plural job in the combination which do not have restriction with the other jobs, where the third selecting is practiced after the individual evaluation of the assignments containing restricted elements.

In this embodiment, when a restriction is detected, jobs containing restriction are replaced with the corresponding restricted jobs, and then individual evaluation is performed. In addition, after the individual evaluation of the restricted job, the other job of the combination is changed to some other job and individual evaluation is performed. Thus, when a restriction is detected, individual evaluation is performed for the combination of all the pairs of restraining jobs and the restricted job. And, there is no need to evaluate the combinations including restricting jobs and non-restricted jobs. This prevents individual evaluation from being performed for unnecessary combinations, thereby speeding condition evaluation and the creation of a schedule through condition evaluation.

In another embodiment, is an expert system which, based on allocation data representing an allocation plan containing a plurality of elements and condition data representing a constraint for the allocation, evaluates the validity of the allocation with the constraint, includes structure for sequentially selecting a combination of elements for evaluation, for performing individual evaluation in which a test is made to see if each combination is consistent with the constraint, for detecting a restriction in which one of the elements of a combination is uniquely determined by the other element of the combination, for replacing the current elements of combination which has restriction with the restricted elements, and for replacing one or plural element of current combination which do not have restriction with the other elements, where the third selecting is practiced after the individual evaluation of the assignments containing restricted elements; and re-creating means for re-creating the allocation proposal.

In this embodiment, constraint evaluation can be performed speedily each time the re-creating means re-creates an allocation. This enables an allocation plan to be generated speedily.

In another embodiment, a constraint evaluation method which, based on allocation data representing an allocation proposal containing plural elements and condition data representing a constraint for the allocation plan, evaluates the validity of the allocation proposal with the constraint, includes the steps of: sequentially selecting a combination of elements for evaluation; performing individual evaluation in which a test is made to see if each combination is consistent with the constraint; detecting a restriction in which one of the elements of a combination is uniquely determined by the other element of the combination during individual evaluation; selecting a restricted element, which is the determined element, instead of one of the elements of the combination; and selecting an element other than the other element of the combination after individual evaluation of the restricted element.

DESCRIPTION OF THE PREFERRED EMBODIMENTS

Referring to the attached drawings, there is shown a constraint evaluation system (hereafter called this system) according to the present invention. It is an object of this invention to provide a constraint evaluation system which speeds up the evaluation by bypassing the evaluation of unnecessary combinations. It is another object of this invention to provide a constraint evaluation system suitable for computer processing involving numerical expressions and variables. It is a still further object of this invention to provide a constraint evaluation system whose operating procedure is simple.

This system is implemented on a computer, and each function of this system is executed according to a specific procedure stored in the computer in the form of a program. In the following discussion, virtual circuit blocks (means), each having the function of this system, are used to describe this system.

The computer usually consists of the CPU (central processing unit) and main storage composed of RAM (random-access memory). A computer of any size, for example, a personal computer or a workstation, may be used as the computer in this system. Typically, the computer has input devices, such as a keyboard and a mouse, external storage units, such as a hard disk, output devices such as a CRT display or a printer, and other required input/output control circuits.

The computer may be built in any configuration, and one or more components may be added, changed or removed as far as the configuration does not depart from the characteristics of this invention. For example, any type of CPU may be used, or a plurality of CPUs may be used at the same time. A single CPU may be used in the time-sharing manner, or a plurality of processes may be executed concurrently. The computer may be on a network. Other types of input device may be connected to the computer; for example, pointing devices such as a touch panel, light pen, and track ball, a digitizer, image input devices such as an image reader and video camera, a voice recognition device, or various types of sensors may be used.

Other external storage devices, including a floppy disk device, RAM card reader, magnetic tape device, optical disk device, magneto-optical (MO) disk device, bubble memory device, and flash memory card may be used on the computer. Other output devices, including a liquid crystal display, plasma display device, video projector, LED display device, voice generator, and voice synthesizer, may be used When a printer is used as the output device, any type of printer may be used: for example, a laser beam printer, ink jet printer, dot impact printer, plotter printer, line printer, thermal printer, discharge printer, or electric typewriter may be used.

In a typical software configuration of this system, a program executing each function of this system runs as an application program under the operating system (OS). This software configuration of the computer may be changed as necessary. For example, the OS need not always be used. In addition, each function of this system may be implemented as a CPU microprogram.

A program may be coded in any form. Typically, the machine language generated by compiling a program coded in a high-level language or assembler is used. However, an interpreter (serially interpretive execution) such as BASIC may be used to code a program.

Each means corresponds to each function of this system only conceptually; so, it is not necessarily an independent piece of hardware. For example, one input means and another input means may be on the same keyboard. Similarly, one output means and another output means may be on the same image display device. Sometimes, a means is used by a single instruction and, some other time, by a plurality of instructions at some other time.

The program of this system may be stored on any storage device. It may be in ROM (Read-Only Memory) or it may be on an external storage device such as a hard disk; in the latter case, the program is loaded (read) into main memory when the computer or the process is started. In addition, the program may be divided into a plurality of modules which are stored on an external storage device. In this case, only the modules necessary for processing are read into main memory. Each program module may be stored on a storage device most suitable for it.

The steps of a procedure used in this embodiment may be changed, a plurality of steps may be executed concurrently, or the steps may be executed in a different sequence each time the program is executed. The ability to change the sequence of execution is implemented by the menu-driven interface which allows the user to select processing he wants to execute.

Unless otherwise stated, data necessary for the processing of this system is retrieved from an area where entered, generated, or saved data is stored. To retrieve data, it is necessary, for example, to access the memory area or variable where data is stored. To erase or remove data, it is not always necessary to physically delete data from the corresponding memory area. Data is erased or removed also by setting the erase flag or by changing the meaning of data.

Although this system is implemented on a computer in this embodiment, all or part of the functions of this system may be packaged on an electronic circuit.

(1) Configuration of this Embodiment

Figure 1:
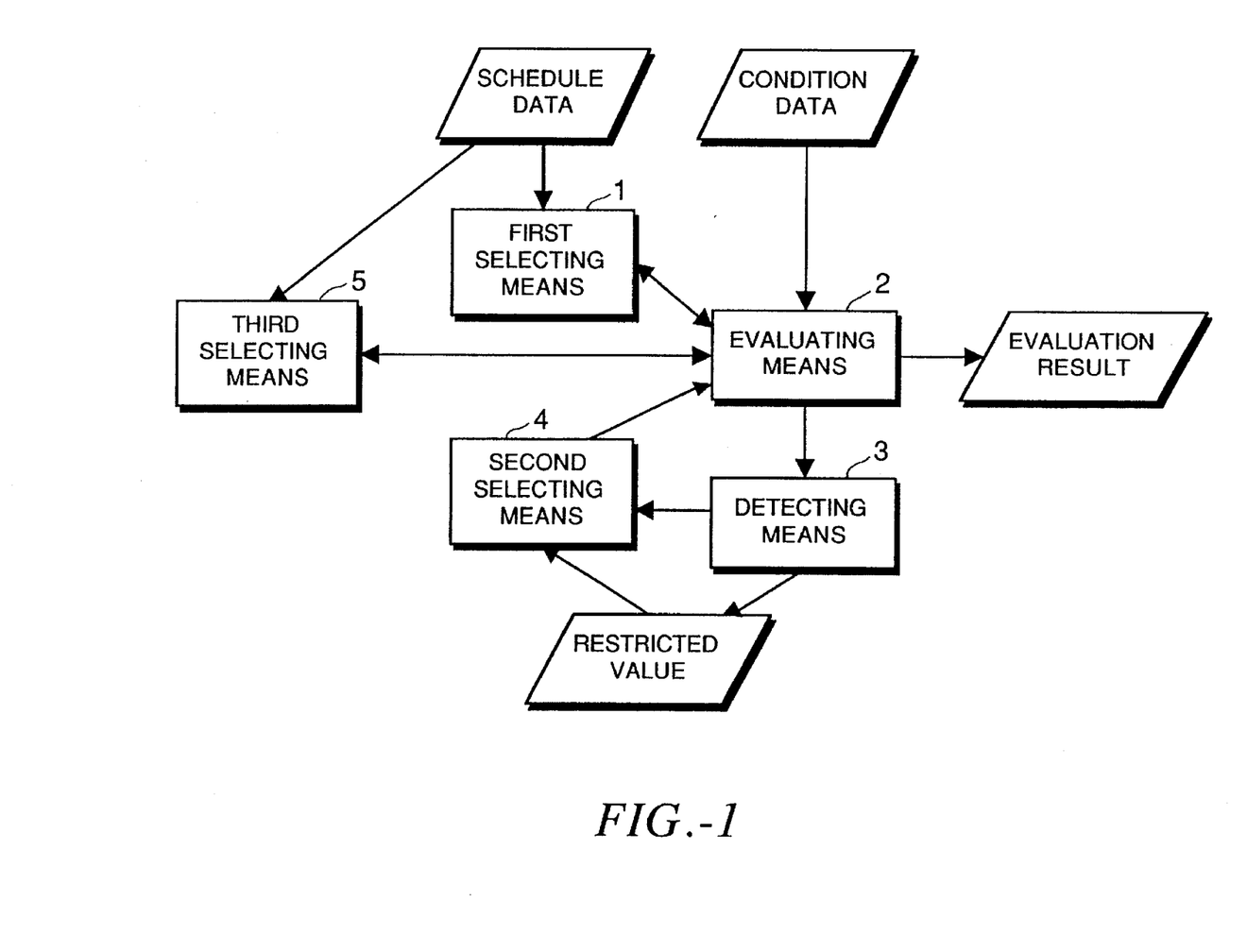
FIG. 1 is a functional block diagram showing the configuration of an embodiment of this invention.

This system is a constraint evaluation system which evaluates the validity of schedule constraints based on schedule data representing a schedule for plural jobs and on condition data representing constraints for the schedule. FIG. 1 is a functional block diagram showing the configuration of this system.

As shown in this figure, this system has the first selecting means 1 which sequentially selects job combinations, one at a time, for evaluation, the evaluating means 2 which performs individual evaluation in which the test is made to evaluate if each combination is consistent with the constraint, and the detecting means 3 which detects a restriction in which one of the jobs of a combination is determined uniquely based on the other job of the combination. In addition, this system has the second selecting means 4 and the third selecting means 5 which are used when a restraint is detected; that is, when a restraint is detected, the second selecting means 4 selects the restrained job, which is the determined job, instead of one of the jobs of the combination, and the third selecting means 5 selects a job other than the other job of the combination after the individual evaluation associated with the restrained job is finished.

In this system, each job is represented by a specific value, and the selection is done by assigning the values (jobs) to the variables (job variables). In this system, the condition data is represented by conditional statements, and the detecting means 3 detects the restriction when an evaluation of equal relationship between a variable value and a function value occurs in the condition statements, and this relationship lead to one-to-one dependency. The condition data of this system consists of the first half (IF portion) representing the application of the constraint and the latter half (THEN portion) representing the contents of the constraint. The detecting means 3 detects the restriction in the first half.

(2) Operation and Effects of the Embodiment

Figure 2:
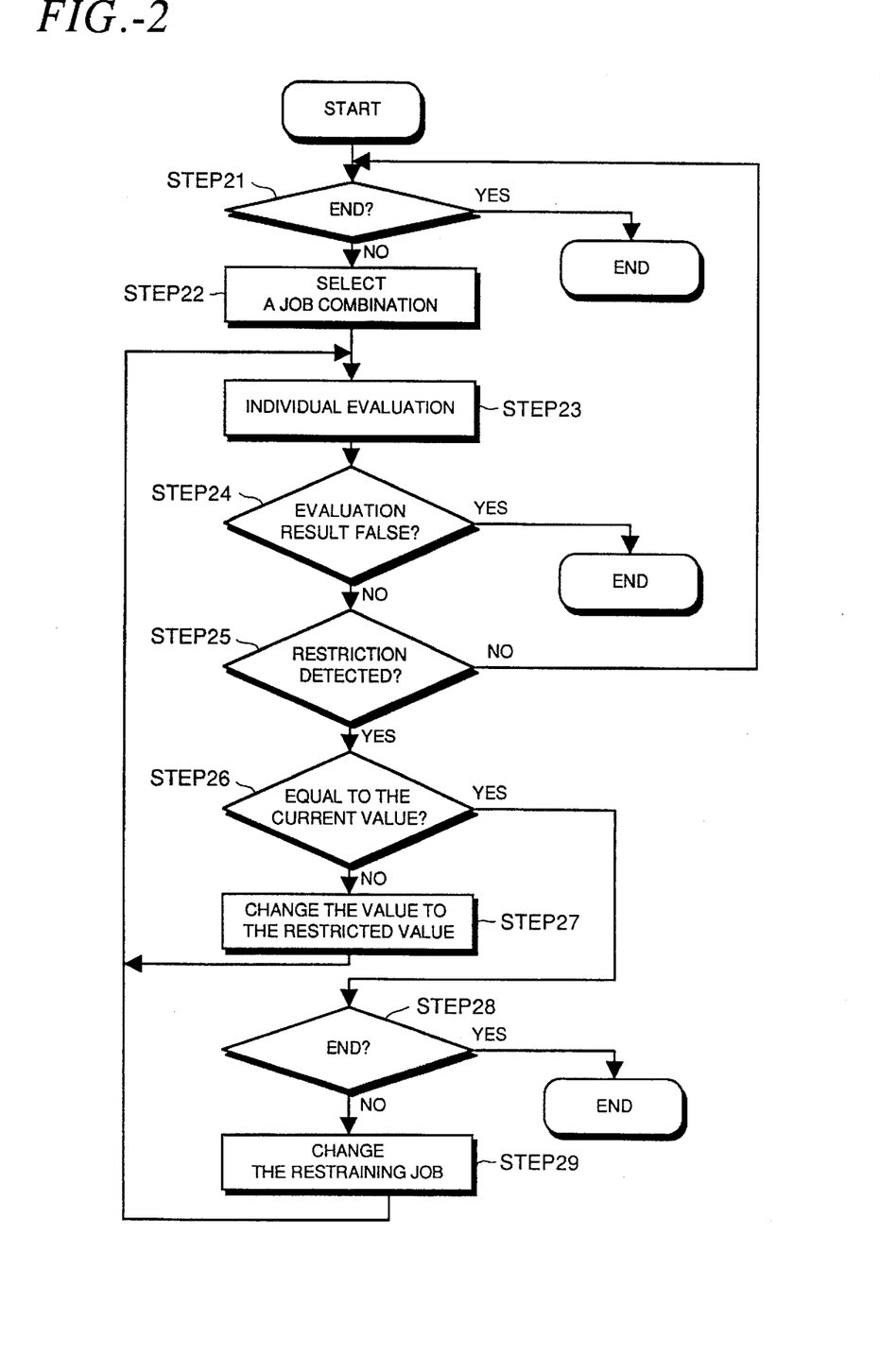
FIG. 2 is a flowchart showing an example of the condition evaluation procedure used in the embodiment of this invention.

This system, which has the configuration as described above, evaluates the constraint as follows. The flowchart in FIG. 2 shows an example of the constraint evaluation procedure used in this system. In this procedure, the first selecting means 1 first selects an unevaluated combination of jobs (step 22), and the evaluating means 2 performs individual evaluation to test if the combination is consistent with the constraint (step 23). The pairs of variable and value to be evaluated at a given point of constraint evaluation are called current values.

During individual evaluation, the detecting means 3 detects a restriction if it exists. The restriction means that the variable value of of a combination is uniquely determined by the other variable value of the combination. The relation between variables like this is called a one-to-one dependency relation. This restraint is detected when the first half of the condition is evaluated; more specifically, it is detected when an evaluation of equal relationship between a variable value and a function value occurs in the condition statements, and this relationship lead to one-to-one dependency.

When a restriction is detected (step 25), the second selecting means 4 replaces the current value, which has restriction, with the restricted value of the job which is uniquely determined by the one-to-one dependency relation (step 27), and the evaluating means 2 performs individual evaluation of the changed combination (step 23). When the restricted value equals the current value (step 26), the individual evaluation associated with the restricted value has already been done. Then, the third selecting means 5 replaces the value of the restricting job (step 29) until unevaluated values are exhausted (step 28), and individual evaluation is repeated (step 23).

On the other hand, when no restriction is detected during individual evaluation (step 25), the selection and individual evaluation of combinations are repeated (steps 22 to 23) until the combinations are exhausted (step 21).

The above procedure ends either when all the combinations corresponding to the first half of the condition meet the constraint (TRUE) or when at least one of the combinations corresponding to the first half of the condition does not meet the constraint (FALSE) (step 24).

When a restriction is detected in this embodiment, the restricted job is replaced with the restricted value, individual evaluation is performed. After that, the restricting jobs are replaced, one at a time, for condition evaluation. Thus, when there is a restriction, individual evaluation is performed for the combination of all the restricting jobs and the corresponding restricted value. Individual evaluation need not be performed for combinations of the restricting job and non-restricted-value jobs. Bypassing the evaluation of unnecessary combinations decreases the number of individual evaluations and, therefore, speeds up constraint evaluation for scheduling.

In this embodiment, each job is represented by a unique value, and the selection is done by assigning a value to a variable. This allows this embodiment to be implemented by computer programs using numerical expressions or variables.

In this embodiment, the detecting means performs detection of restriction when an evaluation of equal relationship between a variable value and a function value occurs in the condition statements, and this relationship lead to one-to-one dependency. This embodiment eliminates the need for pre-detecting the restriction in the conditional statement and pre-determining the pair of restricting value and restricted value, and therefore makes the components of constraint evaluation system simpler Because the detecting means detects a restriction in the first half of the condition where the constraint is specified, there is no need to process the latter half of the constraint for unnecessary combinations, further increasing the speed of constraint evaluation.

(3) An Example of Evaluation

The following shows an example of condition evaluation that is done by this system. In this example, the schedule data contains four jobs, and one constraint is applied.

Figure 3:
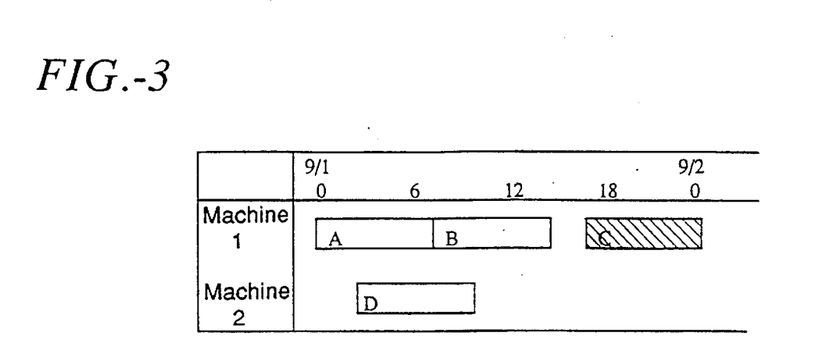
FIG. 3 is an example of schedule data used in the embodiment of this invention.
Figure 4:
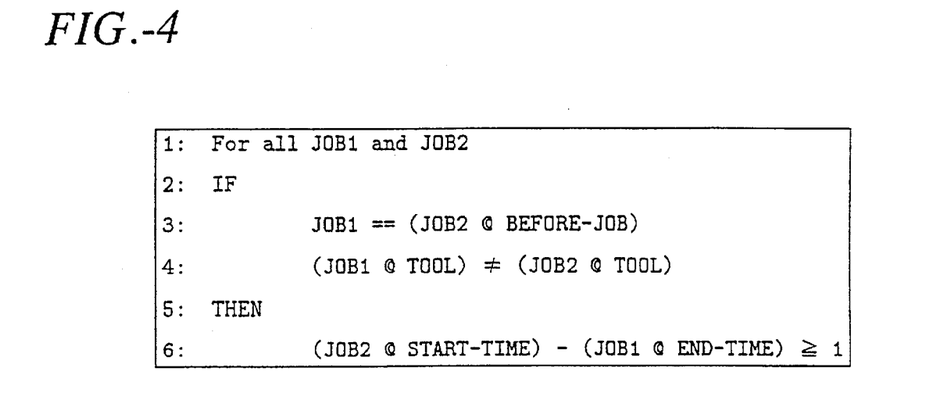
FIG. 4 is an example of condition data used in the embodiment of this invention.

FIG. 3 shows schedule data that is used in the example, and FIG. 4 shows condition data used in the example. The schedule data in FIG. 3 includes 4 jobs: job A, job B, job C, and Job D. The processing time of each job is determined and is arranged on the machine 1 schedule and machine 2 schedule. Jobs A, B, and D use the same tools, while job C uses tools different from those used by jobs A, B, and D.

The condition data in FIG. 4 is described in the rule format using two variables. Lines 2 to 4 of this condition data correspond to the first half (IF portion). Out of these lines, line 3 represents an equal relation (==) expression.

JOB1=(JOB2 @ BEFORE-JOB)

The above expression means "JOB1 and the job immediately preceding JOB2 are equivalent." Line 4 represents an unequal relation (≠) expression.

(JOB1 @ TOOL)≠(JOB2 @ TOOL)

The above expression means "the tools used by JOB1 are not the same as those used by JOB2."

Lines 5 and 6 in the condition data in FIG. 4 correspond to the latter half (THEN portion). Line 6 shown below means that the interval between the start time of JOB2 and the end time of JOB1 must be at least one hour."

(JOB2 @ START-TIME)–(JOB1 @ END-TIME)>1

Thus, this constraint condition indicates that "the interval between two consecutive jobs, each using different tools, must be at least one hour."

Figure 5:
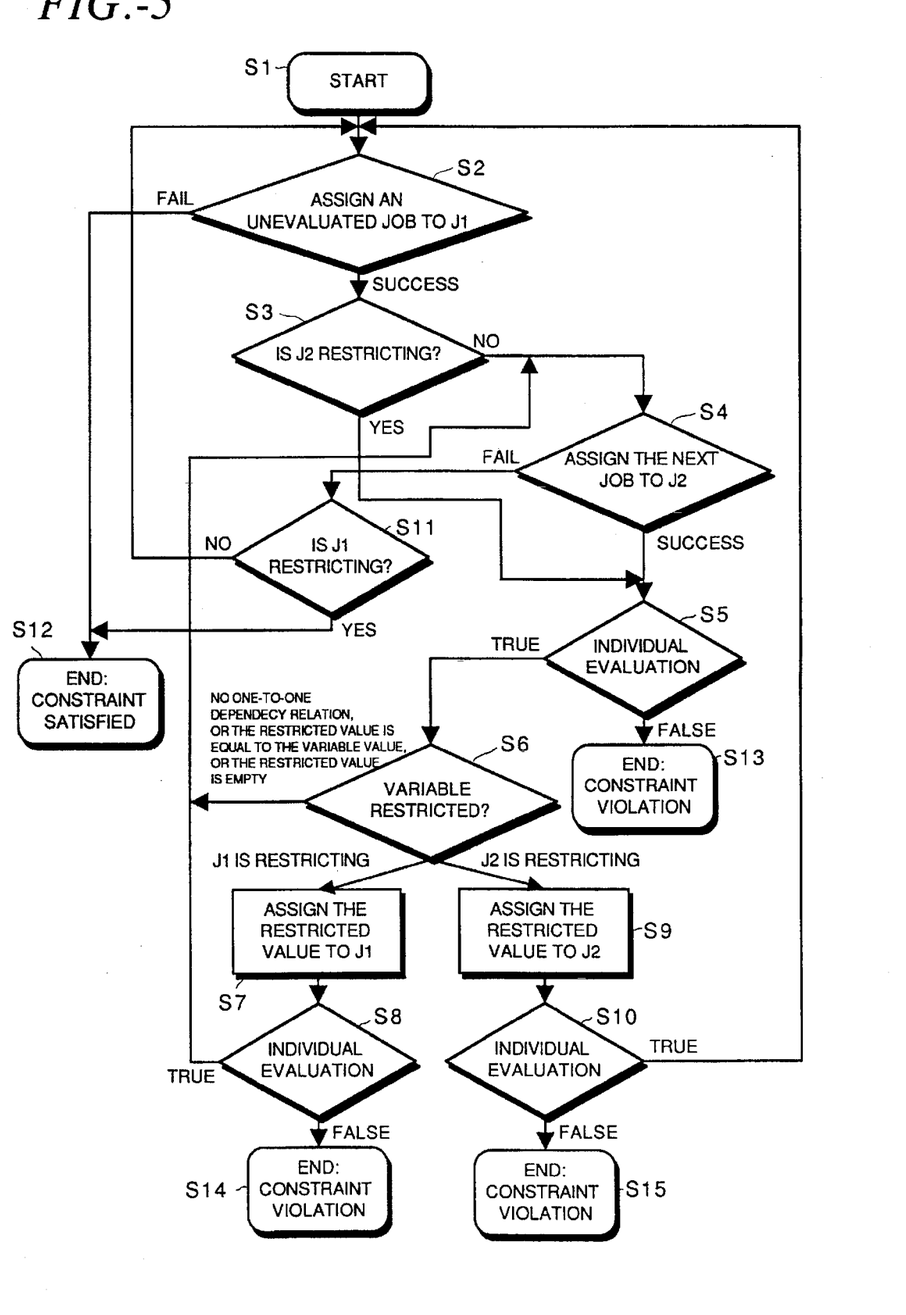
FIG. 5 is a flowchart showing an example of the condition evaluation procedure of the embodiment of this invention in which two variables are used.
Figure 6:
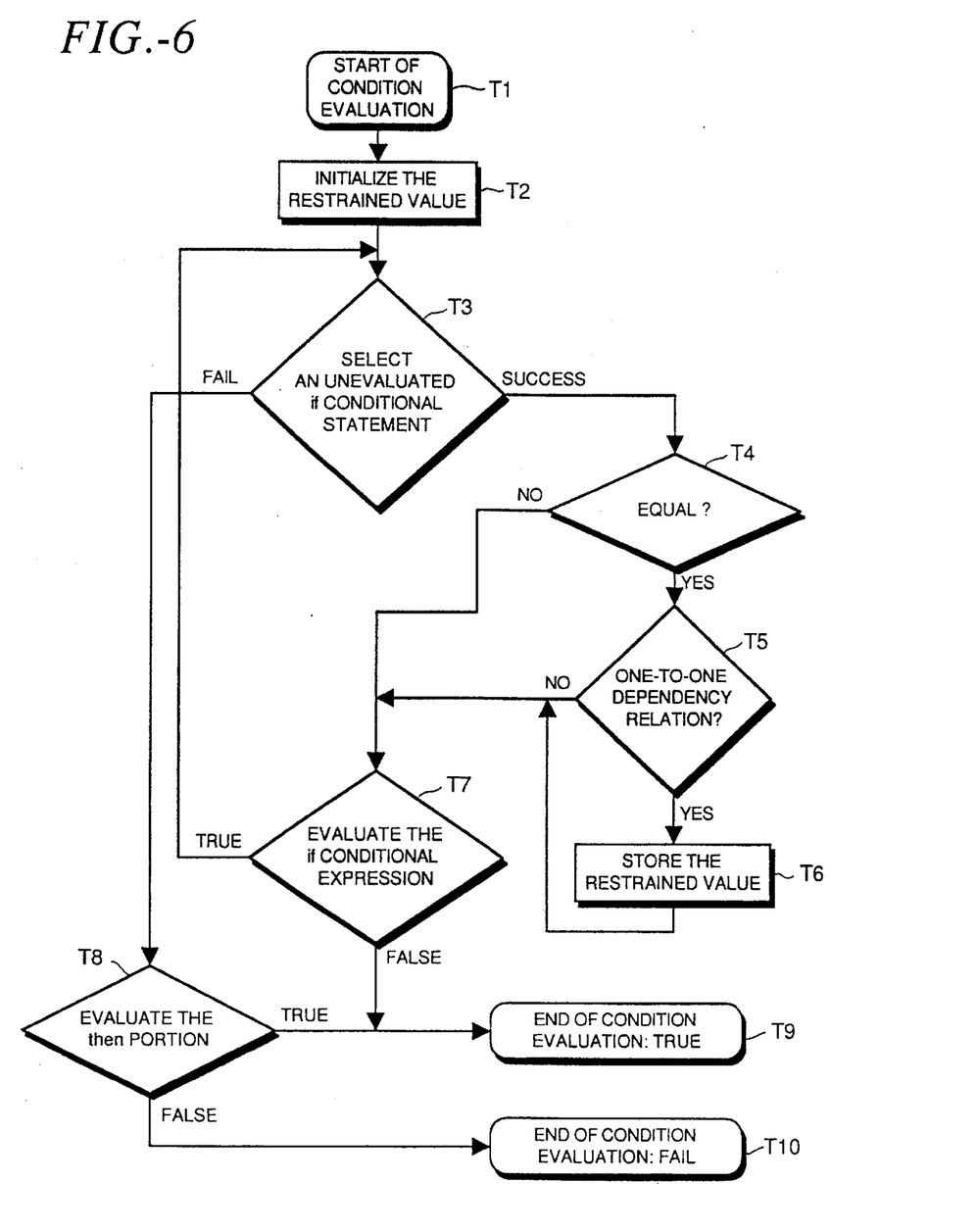
FIG. 6 is a flowchart showing an example of individual evaluation in the embodiment of this invention.

The flowchart in FIG. 5 shows the procedure for the constraint evaluation in this example. That is, the flowchart in FIG. 2 indicates a general flowchart for condition evaluation involving plural job variables, while the flowchart in FIG. 5 indicates a flowchart for constraint evaluation involving two job variables. The flowchart in FIG. 6 shows a sample procedure for individual evaluation in this example.

At the start of the procedure, no restriction is detected. First, job A is assigned to both JOB1 (represented as "J1" in the figure) and JOB2 (represented as "J2" in the figure) (steps S1, S2, S3, and S4), and individual evaluation is performed (step S5).

Immediately after the start of this procedure in this individual evaluation (step T1), the constrained value is initialized (step T2), and the unevaluated IF conditional expression is selected using the condition data (step T3).

JOB1=(JOB2 @ BEFORE-JOB)

Because this expression is an equal relation (step T4), there is a one-to-one dependency relation between JOB1 and JOB2; that is, JOB2 restricts JOB1 (step T5). At this time, because there is no JOB1 that immediately precedes JOB2 (job A), EMPTY is stored as the restricted value (step T6). Table 1 indicates the contents of the variables JOB1, JOB2, restricted variable and restricted value. At this point of processing, the state is state 1.

TABLE 1

| State | JOB1 | JOB2 | restricted variable | restricted value |
| --- | --- | --- | --- | --- |
| State 1 | Job A | Job A | JOB1 | EMPTY |
| State 2 | Job A | Job B | JOB1 | A |
| State 3 | Job A | Job C | JOB1 | B |
| State 4 | Job B | Job C | JOB1 | B |
| State 5 | Job B | Job D | JOB1 | EMPTY |

Then, because the IF statement (JOB1 @ TOOL)≠(JOB2 @ TOOL)

is evaluated FALSE (step T7), the THEN portion is not evaluated and individual evaluation ends (step T9).

Then, job B which is the next unevaluated job is assigned to JOB2 (step S4), and individual evaluation is performed (step S5). Because the IF conditional expression

JOB1=(JOB2 @ BEFORE-JOB)

is evaluated TRUE (step T7) and the next IF condition on line 4

(JOB1 @ TOOL)≠(JOB2 @ TOOL)

is evaluated FALSE, the THEN portion is not evaluated and individual evaluation ends (step T9). When evaluation ends, the restricted value is job A (step T6, state 2) and the evaluation result is TRUE (step T9).

The same procedure as described above is repeated. That is, because the result of individual evaluation is TRUE, the next unevaluated job C is assigned to JOB2 (step S4) and individual evaluation is performed (step S5). When this individual evaluation ends, the restricted value is job B (step T6, state 3) and the evaluation result is TRUE (step T9).

Then, job B which is the restricted value of JOB1 is assigned to the variable JOB1. The result of the IF conditional expression

JOB1=(JOB2 @ BEFORE-JOB)

and the next IF conditional expression on line 4

(JOB1 @ TOOL)≠(JOB2 @ TOOL)

are evaluated TRUE (step 8), and the THEN portion (JOB2 @ START-TIME)–(JOB1 @ END-TIME)>1 are evaluated TRUE (step T8). That is, for JOB1 (job B) and JOB2 (job C), the statement "the interval between the start time of JOB2 and the end time of JOB1 must be at least one hour" is satisfied. When this evaluation ends, the restricted value is job B (state 4).

Then, the unevaluated job D is assigned to JOB2 (step S4), and individual evaluation is performed (step S5). When this evaluation ends, the restricted value is EMPTY (step T6, state 5), and the evaluation result is TRUE (step T9). After that, since there is no job to be assigned to JOB2 (step S4) and JOB1 is a restricted job, condition evaluation ends.

Although there are 12 (4 * 3) possible combinations of JOB1 and JOB2, individual evaluation was performed only five times in the above example. This means that seven unnecessary tests can be bypassed. In addition, if the check is made to prevent the assignment of same job to the variables JOB1 and JOB2 at the same time, another test can be bypassed. Therefore, condition evaluation can be done by performing as few as four individual evaluations.

In FIG. 4, a constraint violation occurs when job B and job C are arranged consecutively (steps S13, S14, and S15).

The restricted variable is JOB1 in the above example, while the restricted variable is JOB2 in the following condition.

(JOB1 @ AFTER-JOB)=JOB2

In that case, the steps in the procedure in FIG. 5 are executed in a different sequence. That is, steps S9 and S10 are executed to prevent individual evaluation from being performed on unnecessary combinations of jobs.

(4) Other Embodiments

This invention may be embodied in other specific forms without departing from the spirit or essential characteristics thereof, including the embodiments given below.

For example, allocation proposals according to this invention apply not only to schedules but also to physical element arrangements. That is, this invention may be applied to constraint evaluation systems in such fields as the system layout design or LSI layout design which verify whether or not each element is located such that it satisfies a given constraint condition.

In addition, in order to detect a restriction, a glossary may be used to detect a description indicating a one-to-one dependency relation between variables that is specified in the first half of the condition data. This eliminates the need for the procedure for assigning values to the variables in the evaluation of conditional statements, making the operating procedure simpler to use.

In general, n variables may be used in a constraint although only two variables are used in the above embodiment. When there is a conditional expression specifying a one-to-n dependency relation, the number of condition evaluations may be reduced by bypassing unnecessary combinations of jobs in the same manner as described above. A conditional expression specifying a one-to-n dependency relation allows the scope of jobs to be narrowed down for evaluation. For example, such descriptions as "jobs that follow" or "jobs that precede" are acceptable. In this case, the restricted values of a conditional expression specifying a one-to-n dependency relation are stored as a set and, from that set, only the combinations of values are selected as combinations of jobs.

As described above, this invention eliminates the need for the test of unnecessary combinations, thus providing a constraint evaluation system, expert system, or constraint evaluation method that performs constraint evaluation speedily.

What is claimed is:

1. A constraint evaluation system which, based on allocation proposal data representing an allocation proposal including a plurality of elements and condition data representing a constraint for the allocation proposal, evaluates the validity of the allocation proposal with the constraint, said constraint evaluation system comprising:

first selecting means for sequentially selecting a combination of elements, included in the allocation proposal, for evaluation;

evaluating means for performing an evaluation of each combination selected by said first selecting means to verify that the combination is consistent with the constraints;

detecting means for detecting a restriction in a constraint, said restriction representing that one element of a combination of elements is uniquely determined by the other element of the combination;

second selecting means for replacing a first element of the selected combination with an element determined by a second element of the combination based on the restriction when the restriction is detected in the constraint; and third selecting means for replacing the second element of the combination including the determined element with another element based on an evaluation of the combination.

2. A constraint evaluation system as claimed in claim 1, wherein the elements are represented by variables, and the selection is performed by assigning elements to variables.

3. A constraint evaluation system as claimed in claim 2, wherein the condition data is represented by conditional statements, and the detecting means detects the restriction when an evaluation of equal relationship between a variable value and a function value occurs in the condition statements, and this relationship lead to one-to-one dependency.

4. A constraint evaluation system as claimed in claim 1, wherein the condition data consists of the first half representing objects to which a corresponding constraint is applied and the latter half representing the contents of the constraint, and the detecting means detects the restriction in the evaluation of first half.

5. A constraint evaluation system as claimed in claim 1, wherein the detecting means detects a restriction by detecting specified data in the condition data which causes the restriction.

6. A constraint evaluation system which, based on allocation proposal data representing an allocation proposal including a plurality of jobs and condition data representing a constraint for the allocation proposal, evaluates the validity of the allocation proposal with the constraint, said constraint evaluation system comprising:

first selecting means for sequentially selecting a combination of jobs, which are including in the allocation proposal, for evaluation;

evaluating means for performing an evaluation of each combination selected by said first selecting means to verify that the combination is consistent with the constraint;

detecting means for detecting a restriction in a constraint, said restriction representing that one job of a combination of jobs is uniquely determined by the other job of the combination;

second selecting means for replacing a first job of the selected combination with a job determined by a second job of the combination based on a restriction when the restriction is detected in the constraint; and third selecting means for replacing the second job of the combination including the determined job with another job based on an evaluation of the combination.

7. An expert system which, based on allocation proposal data representing an allocation proposal including a plurality of elements and condition data representing a constraint for the allocation proposal, evaluates the validity of the allocation proposal with the constraint, said expert system comprising:

first selecting means for sequentially selecting a combination of elements, included in the allocation proposal, for evaluation;

evaluating means for performing an evaluation of each combination selected by said first selecting means to verify that the combination is consistent with the constraint;

detecting means for detecting a restriction in a constraint, said restriction representing that one element of a combination of elements is uniquely determined by the other element of the combination;

second selecting means for replacing a first element of the selected combination with an element determined by a second element of the combination based on a restriction when the restriction is detected in the constraint;

third selecting means for replacing the second element of the combination including the determined element with another element based on an evaluation of the combination; and re-creating means for re-creating the allocation proposal.

8. An constraint evaluation method which, based on allocation proposal data representing an allocation proposal including a plurality of elements and condition data representing a constraint for the allocation proposal, evaluates the validity of the allocation proposal with the constraint, said constraint evaluation method comprising the steps of:

sequentially selecting a combination of elements, which are included in the allocation proposal, for evaluation;

performing an evaluation of each combination selected by said selecting step to verify that the combination is consistent with the constraint;

detecting a restriction in a constraint, said restriction representing that one element of a combination of elements is uniquely determined by the other element of the combination;

replacing a first element of the selected combination with an element determined by a second element of the combination based on a restriction when the restriction is detected in the constraint; and replacing the second element of the combination including the determined element with another element based on an evaluation of the combination.

9. A constraint evaluation system which, based on allocation proposal data representing an allocation proposal including a plurality of elements and condition data representing a constraint for the allocation proposal, evaluates the validity of the allocation proposal with the constraint by performing an evaluation of each combination of elements included in the allocation proposal, said constraint evaluation system comprising:

detecting means for detecting a restriction in a constraint, said restriction representing that one element of a combination of elements is uniquely determined by the other element of the combination; and selecting means for replacing one element of a combination of elements to be evaluated currently with an element determined by the other element of the combination based on a restriction when the restriction is detected in the constraint.

10. A constraint evaluation system as claimed in claim 9, wherein the elements are represented by variables, and the selection is performed by assigning elements to variables.

11. A constraint evaluation system as claimed in claim 10, wherein the condition data is represented by conditional statements, and the detecting means detects the restriction when an evaluation of equal relationship between a variable value and a function value occurs in the condition statements, and this relationship leads to one-to-one dependency.

12. A constraint evaluation system as claimed in claim 9, wherein the condition data consists of a first half representing objects to which a corresponding constraint is applied and a latter half representing contents of the constraint, and the detecting means detects the restriction in the evaluation of the first half.

13. A constraint evaluation system as claimed in claim 9, wherein the detecting means detects a restriction by detecting specified data in the condition data which causes the restriction.

14. A constraint evaluation method which, based on allocation proposal data representing an allocation proposal including a plurality of elements and condition data representing a constraint for the allocation proposal, evaluates the validity of the allocation proposal with the constraint by performing an evaluation of each combination of elements included in the allocation proposal, said constraint evaluation method comprising steps of:

detecting a restriction in a constraint, said restriction representing that one element of a combination of elements is uniquely determined by the other element of the combination; and replacing one element of a combination of elements to be evaluated currently with an element determined by the other element of the combination based on a restriction when the restriction is detected in the constraint.

* * * * *

UNITED STATES PATENT AND TRADEMARK OFFICE
CERTIFICATE OF CORRECTION

PATENT NO. : 5,671,338
DATED : September 23, 1997
INVENTOR(S) : Dai Araki et al.

It is certified that error appears in the above-indentified patent and that said Letters Patent is hereby corrected as shown below:

In claim 3, column 11, line 62, "lead" should read --leads--.

In claim 8, column 12, line 57, "An constraint should read --A constraint--.

Signed and Sealed this

Tenth Day of March, 1998

Attest:

BRUCE LEHMAN

Attesting Officer    Commissioner of Patents and Trademarks